United States Patent
Komada et al.

(10) Patent No.: US 10,295,437 B2
(45) Date of Patent: May 21, 2019

(54) ELECTRIC MOTOR TEST SYSTEM

(71) Applicant: HORIBA, Ltd., Kyoto (JP)

(72) Inventors: Mineyuki Komada, Kyoto (JP); Kazuhisa Sasahara, Kyoto (JP)

(73) Assignee: HORIBA, LTD., Kyoto (JP)

( * ) Notice: Subject to any disclaimer, the term of this patent is extended or adjusted under 35 U.S.C. 154(b) by 139 days.

(21) Appl. No.: 15/313,747

(22) PCT Filed: Aug. 21, 2015

(86) PCT No.: PCT/JP2015/073517
§ 371 (c)(1),
(2) Date: Nov. 23, 2016

(87) PCT Pub. No.: WO2016/035575
PCT Pub. Date: Mar. 10, 2016

(65) Prior Publication Data
US 2017/0191903 A1 Jul. 6, 2017

(30) Foreign Application Priority Data

Sep. 3, 2014 (JP) .................... 2014-179506

(51) Int. Cl.
*G01L 3/24* (2006.01)
*G01L 5/13* (2006.01)
(Continued)

(52) U.S. Cl.
CPC .......... *G01M 17/0072* (2013.01); *G01L 3/24* (2013.01); *G01L 5/13* (2013.01); *G01M 15/00* (2013.01); *G01M 15/02* (2013.01); *H02K 15/02* (2013.01)

(58) Field of Classification Search
CPC .. G01M 17/0072; G01M 15/00; G01M 15/02; G01L 3/24; G01L 5/13; H02K 15/02; H02K 11/20; H02K 11/24
(Continued)

(56) References Cited

U.S. PATENT DOCUMENTS 2,520,696 A * 8/1950 Smith .................... H02K 49/08
310/140
9,205,556 B1* 12/2015 Magnusson .......... G05B 19/404
2005/0011288 A1* 1/2005 Flammer .................. G01L 5/26
73/862.26

FOREIGN PATENT DOCUMENTS

CN 101000281 A 7/2007
CN 101387688 A 3/2009
(Continued)

OTHER PUBLICATIONS

Poels, P.W.; Cogging Torque Measurement, Moment of Inertia Determination and Sensitivity analysis of Axial Flux Permanent Magnet AC motor; 2008; Technische Universiteit Eindhoven.*
(Continued)

*Primary Examiner* — Eric S. McCall
*Assistant Examiner* — Timothy P Graves
(74) *Attorney, Agent, or Firm* — Brooks Kushman P.C.

(57) ABSTRACT

In order to easily and accurately measure the cogging torque of an electric motor, the present invention includes a dynamometer connected to an electric motor, a torque sensor adapted to measure the torque of the electric motor, and a cogging torque measurement motor for measuring the cogging torque of the electric motor, and is configured such that when measuring the cogging torque of the electric motor, the electric motor, the dynamometer, and the cogging torque measurement motor are connected.

6 Claims, 3 Drawing Sheets

(51) Int. Cl.
  *G01M 17/007* (2006.01)
  *H02K 15/02* (2006.01)
  *G01M 15/00* (2006.01)
  *G01M 15/02* (2006.01)

(58) Field of Classification Search
  USPC .......................................... 73/1.09; 701/114
  See application file for complete search history.

(56) References Cited

FOREIGN PATENT DOCUMENTS

| | | |
|---|---|---|
| CN | 101458527 A | 6/2009 |
| CN | 101753073 A | 6/2010 |
| CN | 102829979 A | 12/2012 |
| CN | 103808444 A | 5/2014 |
| CN | 102937699 B | 6/2015 |
| JP | 06-109565 A | 4/1994 |
| JP | 2000-035380 A | 2/2000 |
| JP | 2006-220497 A | 8/2006 |
| JP | 2009-042137 A | 2/2009 |
| JP | 2010-014534 A | 1/2010 |
| TW | M275408 U | 9/2005 |
| WO | 2013-186871 A1 | 12/2013 |

OTHER PUBLICATIONS

International Search Report for Application No. PCT/JP2015/073517, dated Nov. 5, 2015, 3 pgs.
EESR dated Mar. 15, 2018 issued for European Patent Application No. 15 837 808.3.
Official Action dated Apr. 28, 2018 issued for Chinese Patent Application No. 201580026558.X, 15 pgs.

\* cited by examiner

ELECTRIC MOTOR TEST SYSTEM

CROSS-REFERENCE TO RELATED APPLICATIONS

This application is the National Stage of International Application No. PCT/JP2015/073517, filed Aug. 21, 2015, which claims priority to JP Patent Application No. 2014-179506, filed Sep. 3, 2014, the disclosures of which are incorporated in their entirety by reference herein.

TECHNICAL FIELD

The present invention relates to an electric motor test system adapted to test the performance of an electric motor mounted in such as an electric vehicle (EV), a hybrid electric vehicle (HEV).

BACKGROUND ART

As this sort of electric motor test system, for example, there is one configured to simulate an actual running state to test the performance of an electric motor by connecting a dynamometer to the electric motor and making the dynamometer function as a driving device or a loading device.

More specifically, in order to simulate the actual running state, it is adapted to measure the torque generated between the electric motor and the dynamometer, and on the basis of the resulting measured value, determine such as a required load to control the dynamometer.

Meanwhile, in the past, when measuring the cogging torque generated in the electric motor in the above-described electric motor test system, it has been adapted to detach the electric motor from the dynamometer, and connect the electric motor to a dedicated cogging torque measurement device as disclosed in, for example, Patent Literature 1 for the measurement.

However, the work to detach the electric motor from the dynamometer and move the electric motor to the cogging torque measurement device for attachment every time for the cogging torque measurement requires alignment such as centering, and this takes much effort and time.

Further, when doing this, if misalignment occurs in such as the centering, the problem of being unable to accurately measure the cogging torque may also occur due to the effect of the misalignment.

CITATION LIST

Patent Literature

Patent Literature 1: Japanese Unexamined Patent Publication JP-A2010-14534

SUMMARY OF INVENTION

Technical Problem

Therefore, the present invention is made in order to solve the above-described problems, and the main object thereof is to, in a system adapted to test the performance of an electric motor using a dynamometer, easily and accurately measure a cogging torque generated in the electric motor.

Solution to Problem

That is, an electric motor test system according to the present invention is an electric motor test system adapted to test the performance of an electric motor of a vehicle, and the electric motor test system includes: a dynamometer that is connected to the electric motor; a torque sensor adapted to measure the torque of the electric motor; and a cogging torque measurement motor for measuring the cogging torque of the electric motor, in which when measuring the cogging torque of the electric motor, the electric motor, the dynamometer, and the cogging torque measurement motor are connected.

In such an electric motor test system, since when measuring the cogging torque of the electric motor, the electric motor, the dynamometer, and the cogging torque measurement motor are connected, by bringing the dynamometer to an unloaded state, the cogging torque can be measured without detaching the electric motor from the dynamometer. This indicates that by preliminarily fixing the electric motor, the dynamometer, and the cogging torque measurement motor so as to make the shaft lines of the mutual rotating shafts thereof coincide, after that, misalignment such as centering is unlikely to occur. Accordingly, by transmitting the rotation of the cogging torque measurement motor to the electric motor, the cogging torque can be easily and accurately measured.

It is preferable that the electric motor is connected to one end side of the rotating shaft of the dynamometer, and the cogging torque measurement motor is connected to the other end side of the rotating shaft. Note that for example, when connecting the cogging torque measurement motor to a shaft connecting the electric motor and the dynamometer, it is necessary to use such as a bevel gear at the connecting point between the shaft and the cogging torque measurement motor. On the other hand, the above-described configuration makes it possible to connect the cogging torque measurement motor to the dynamometer with a simple configuration.

In addition, specific embodiments include one in which the electric motor is connected to the one end side of the rotating shaft of the dynamometer, and the cogging torque measurement motor is connected to the one end side of the rotating shaft or to a connecting mechanism connecting the electric motor to the one end side of the rotating shaft.

This case requires the use of such as a bevel gear as described above, but is advantageous when a space to install the electric motor test system is confined in a direction of the rotating shafts of the electric motor and the dynamometer.

It is preferable that the torque sensor is provided on a side of the electric motor rather than the cogging torque measurement motor.

In doing so, in a state where the rotation of the cogging torque measurement motor is transmitted to the electric motor, the measured torque measured by the torque sensor is measured as the cogging torque, and in a state where the rotation of the dynamometer is transmitted to the electric motor, measured as a regular test torque used to test the performance of the electric motor. That is, the torque sensor can be used for both the cogging torque measurement and the regular test torque measurement to thereby eliminate the need for a dedicated torque sensor for measuring the cogging torque.

It is preferable to further include a connecting/disconnecting mechanism provided between the cogging torque measurement motor and the dynamometer, in which the connecting/disconnecting mechanism, when measuring the cogging torque of the electric motor, connects the cogging torque measurement motor to the dynamometer, and when doing a regular test to test the performance of the electric motor, disconnects the cogging torque measurement motor from the dynamometer.

In doing so, although when rotating at high speed, the cogging torque measurement motor may be damaged, by disconnecting the cogging torque measurement motor from the dynamometer when doing the regular test, high speed rotation of the dynamometer can be prevented from transmitting to the cogging torque measurement motor, and thereby the cogging torque measurement motor can be prevented from being damaged.

It is preferable to include a speed reducer that is connected to the cogging torque measurement motor to reduce the rotation speed of the cogging torque measurement motor.

In doing so, rotation stability in low rotation speed performance required for the cogging torque measurement motor can be improved.

Advantageous Effects of Invention

According to the present invention configured as described, without moving the electric motor, the need for alignment such as centering, which has been required in the past whenever measuring cogging toque, can be eliminated and the cogging torque of the electric motor can be easily and accurately measured.

REFERENCE SIGNS LIST

Figure 1:
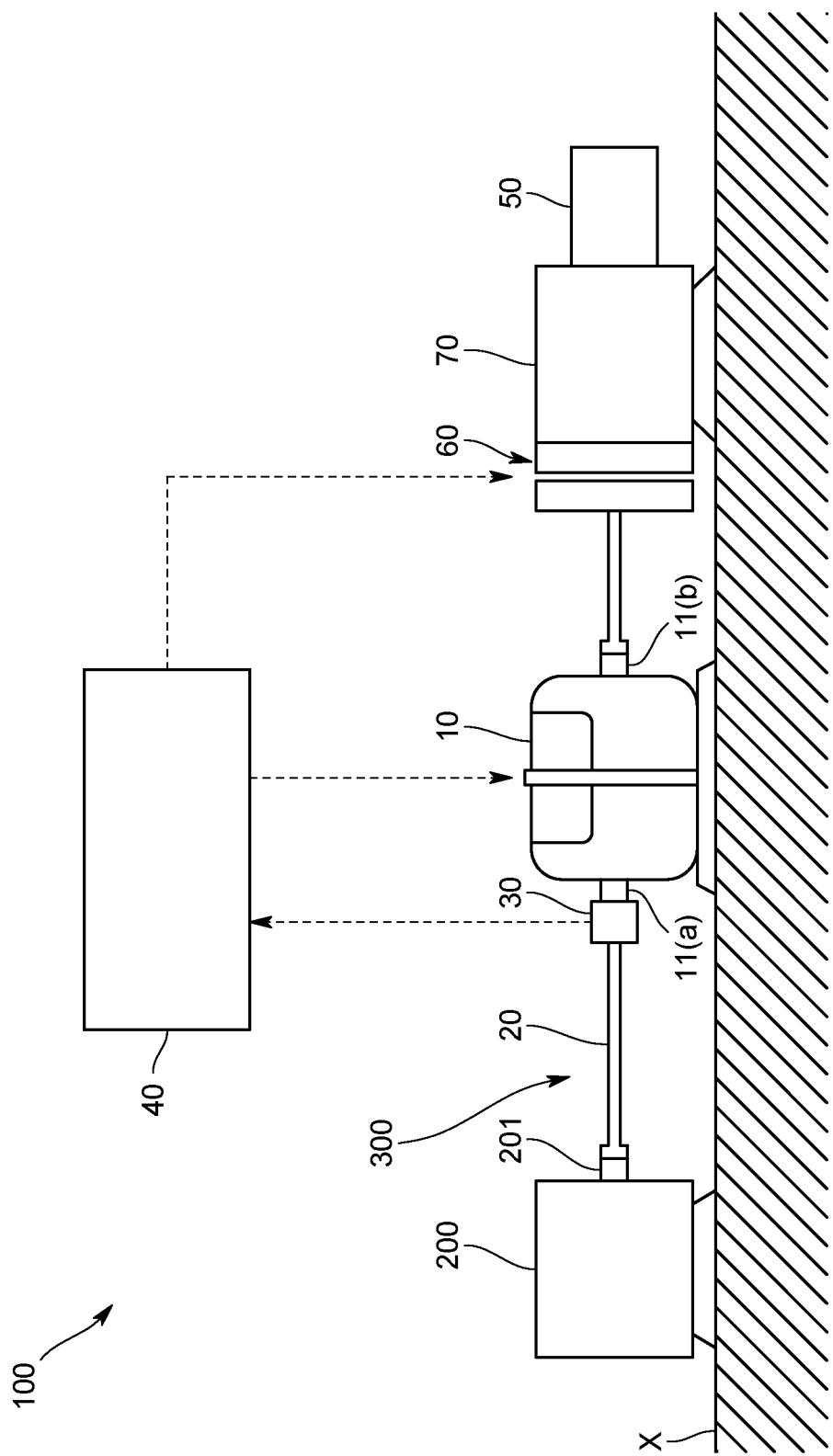
FIG. 1 is a diagram schematically illustrating an overall configuration of an electric motor test system of the present embodiment.

100 Electric motor test system
200 Electric motor
10 Dynamometer
20 Connecting mechanism
300 Rotation transmitting system
30 Torque sensor
50 Cogging torque measurement motor
60 Connecting/disconnecting mechanism

DESCRIPTION OF EMBODIMENTS

In the following, one embodiment of an electric motor test system according to the present invention will be described with reference to the drawings.

An electric motor test system 100 according to the present embodiment is one that tests such as the operating performance of an electric motor 200 of an electric vehicle or a hybrid vehicle on a test bench, and as illustrated in FIG. 1, configured to include: a dynamometer 10 connected to the electric motor 200; a connecting mechanism 20 adapted to connect the rotating shaft 201 of the electric motor 200 and the rotating shaft 11 of the dynamometer 10; a torque sensor 30 adapted to measure a torque generated between the electric motor 200 and the dynamometer 10; and a control device 40 adapted to receive an output from the torque sensor 30.

Note that in the present embodiment, the electric motor 200 and the dynamometer 10 are placed and fixed on, for example, a floor or a base X.

The dynamometer 10 is one that performs a test run of the electric motor 200, and depending on a state of the test run, works as an electric motor and thereby functions as a driving device for driving the electric motor 200, or works as an electric generator and thereby functions as a loading device for placing a load on the electric motor 200.

Specifically, the dynamometer 10 is an AC electric dynamometer including an unillustrated electric motor as an AC motor, and in the present embodiment, as illustrated in FIG. 1, one of a both-end drive type configured to be able to output powers from one end side 11a and the other end side 11b of the rotating shaft 11.

The connecting mechanism 20 is one that mechanically connects the rotating shaft 201 of the electric motor 200 and the rotating shaft 11 of the dynamometer 10, and specifically, includes such as a shaft connected to the rotating shaft 201 of the electric motor 200 and the one end side 11a of the rotating shaft 11 of the dynamometer 10, a coupling connecting the shaft and the rotating shaft 201, a coupling connecting the shaft and the one end side 11a. Alternatively, as the connecting mechanism 20, such as a gear may be used.

With the above-described configuration, the rotating shaft 201 of the electric motor 200, the rotating shaft 11 of the dynamometer 10, and the connecting mechanism 20 mechanically connecting them rotate with the shaft lines thereof made to coincide, and constitute a rotation transmitting system 300. Note that the rotation transmitting system 300 has the rotating shaft 201 of the electric motor 200, the rotating shaft 11 of the dynamometer 10, and the connecting mechanism 20 connecting the electric motor 200 and the dynamometer 10, and in the present embodiment, further has a connecting mechanism including such as a shaft, a coupling connected to the other end side 11b of the rotating shaft 11 of the dynamometer 10.

The torque sensor 30 is one that is connected to the rotation transmitting system 300 to measure the torque of the electric motor 200, and outputs a measurement signal indicating the resulting measured value to the control device 40, and here, as the torque sensor 30, for example, one of a flange type is used.

Note that as the torque sensor 30, ones of various types such as a contact type and a noncontact type may be used.

The control device 40 is one that receives the measurement signal from the above-described torque sensor 30, on the basis of the torque indicated by the measurement signal, calculates such as a load placed on the electric motor 200, and controls the dynamometer 10 so as to bring the electric motor 200 to a predetermined test run state.

In addition, as illustrated in FIG. 1, in order to measure the cogging torque of the electric motor 200, the electric motor test system 100 of the present embodiment further includes a cogging torque measurement motor 50 that is connected to the above-described rotation transmitting system 300 in a disconnectable manner, and rotates the rotating shaft 201 of the electric motor 200 to generate the cogging torque.

The cogging torque measurement motor 50 is fixed to the base X and also provided on a side of the dynamometer 10 rather than the above-described torque sensor 30 through a connecting/disconnecting mechanism 60 and a speed reducer 70. In the present embodiment, the cogging torque measurement motor 50 is connected to the other end side 11b of the rotating shaft 11 of the above-described dynamometer 10, and specifically a low rotation speed motor adapted to rotate the rotating shaft 201 of the electric motor 200 at low speed having a predetermined rotation speed.

Note that the cogging torque measurement motor 50 may be one adapted to perform angle control of the rotating axis 201 of the electric motor 200. In this case, as the cogging torque measurement motor 50, one configured to alternately repeat a rotating state of rotating the rotating shaft 201 by a predetermined angle and a halting state of halting the rotating shaft 201 for a predetermined time can be cited.

The connecting/disconnecting mechanism 60 is one that is provided between the cogging torque measurement motor 50 and the dynamometer 10, and receives a control signal from the control device 40 to switch between a connection state of connecting the cogging torque measurement motor 50 to the rotation transmitting system 300 and a disconnection state of disconnecting the cogging torque measurement motor 50 from the rotation transmitting system 300. The connecting/disconnecting mechanism 60 in the present embodiment is connected to the other end side 11b of the rotating shaft 11 of the dynamometer 10 through the shaft, and specifically, configured using a clutch mechanism such as an electromagnetic clutch.

The speed reducer 70 is one that reduces the rotation speed of the cogging torque measurement motor 50 at a predetermined speed reduction ratio (e.g., 1/100 or 1/1000), and in the present embodiment, placed and fixed on the base X and also provided between the cogging torque measurement motor 50 and the connecting/disconnecting mechanism 60.

The above-described arrangement makes it possible to connect/disconnect the speed reducer 70 to/from the rotation transmitting system 300 together with the cogging torque measurement motor 50 because the connecting/disconnecting mechanism 60 is provided between the dynamometer 10 and the speed reducer 70.

Subsequently, the actions of the electric motor test system 100 of the present embodiment will be described.

First, the rotation transmitting system 300 and the cogging torque measurement motor 50 are arranged fixed on the base X so as to make the shaft lines of the rotating shafts thereof coincide.

Next, the regular test time for the electric motor test system 100 to test the performance of the electric motor 200 will be described.

When doing a regular test, the connecting/disconnecting mechanism 60 receives a control signal from the control device 40 to switch to the disconnection state, and disconnects the cogging torque measurement motor 50 from the rotation transmitting system 300. Note that when doing this, it is preferable to power off the cogging torque measurement motor.

In the disconnection state, the torque sensor 30 measures the torque generated between the electric motor 200 and the dynamometer 10, and outputs a measurement signal indicating the measured torque to the control device 40.

The control device 40 acquires the torque indicated by the measurement signal as a regular test torque, and on the basis of the regular test torque, controls the dynamometer 10 to make the dynamometer 10 function as the driving device or the loading device.

This makes it possible to bring the electric motor 200 to the predetermined test run state and test the operating performance of the electric motor 200.

Subsequently, the cogging torque measurement time for the electric motor test system 100 to measure the cogging torque generated in the electric motor 200 will be described.

When measuring the cogging torque, the connecting/disconnecting mechanism 60 receives a control signal from the control device 40 to switch to the connection state, and connects the cogging torque measurement motor 50 to the rotation transmitting system 300.

In the connection state, by bringing the dynamometer 10 to an unloaded state, the dynamometer 10 is made free, and therefore the cogging torque measurement motor 50 rotates the electric motor 200 at low speed.

At this time, the torque sensor 30 measures the torque generated in such a way that the cogging torque measurement motor 50 rotates the electric motor 200, and outputs a measurement signal indicating the measured torque to the control device 40.

As a result, the control device 40 can acquire the torque indicated by the measurement signal as the cogging torque of the electric motor 200.

In the electric motor test system 100 according to the present embodiment configured as described, since the cogging torque measurement motor 50 and the rotation transmitting system 300 are preliminarily arranged fixed on the base X so as to make the shaft lines of the rotating shafts thereof coincide, when switching the connecting/disconnecting mechanism 60, misalignment such as centering having occurred in the past is unlikely to occur. As a result, by switching the connecting/disconnecting mechanism 60 to the connection state to connect the cogging torque measurement motor 50 to the rotation transmitting system 300, the cogging torque can be easily and accurately measured.

In addition, when doing the regular test to test the performance of the electric motor 200, by disconnecting the cogging torque measurement motor 50 from the rotation transmitting system 300, the rotation of the dynamometer 10 is not transmitted to the cogging torque measurement motor 50, and therefore the cogging torque measurement motor 50 can be prevented from rotating at high speed to get damaged.

Also, since the electric motor test system 100 includes the speed reducer 70 adapted to reduce the rotation speed of the cogging torque measurement motor 50, low rotation speed performance required for the cogging torque measurement motor 50 can be relaxed.

Further, even if the speed reducer 70 is one having a low allowable rotation speed, the connecting/disconnecting mechanism 60 is provided between the speed reducer 70 and the dynamometer 10, and therefore when doing the regular test, the connecting/disconnecting mechanism 60 can disconnect the speed reducer 70 and the rotation transmitting system 300 from each other to prevent the rotation of the dynamometer 10 from transmitting to the speed reducer 70, thus being secure against damaging the speed reducer 70.

In addition, since the torque sensor 30 is provided between the shaft and the one end side 11a of the rotating shaft 11 of the dynamometer 10, a dedicated part for attaching the torque sensor 30 to such as the shaft is not required, thus making it possible to simplify a configuration.

Note that the present invention is not limited to the above-described embodiment.

Figure 2:
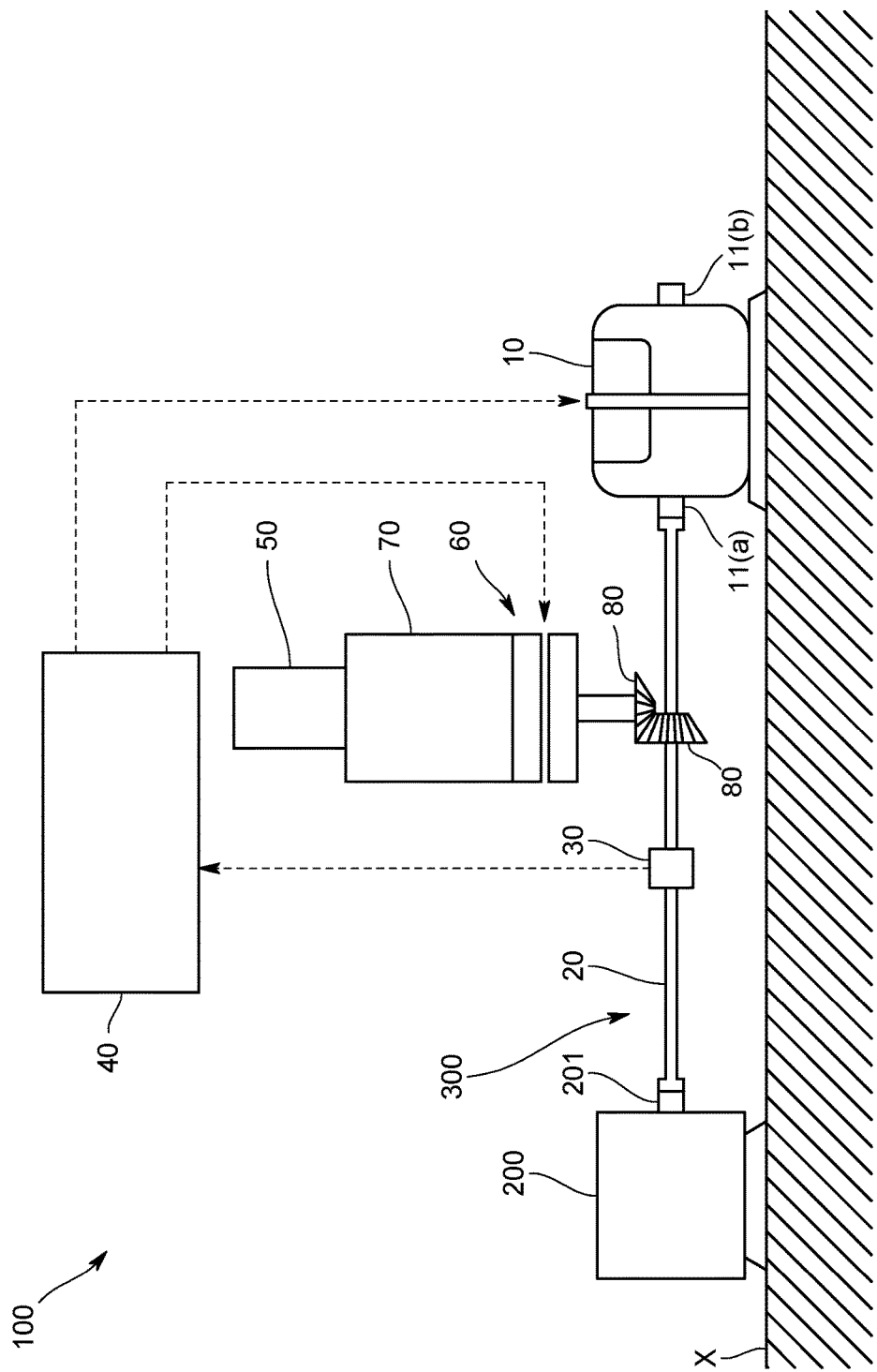
FIG. 2 is a diagram schematically illustrating an overall configuration of an electric motor test system of a variation.

For example, in the above-described embodiment, the cogging torque measurement motor 50 is connected to the other end side 11b of the rotating shaft 11 of the dynamometer 10 through the connecting/disconnecting mechanism 60 and the speed reducer 70; however, as illustrated in FIG. 2, the cogging torque measurement motor 50 may be connected to the one end side 11a of the rotating shaft 11 of the dynamometer 10 through the connecting/disconnecting mechanism 60 and the speed reducer 70.

Specifically, as illustrated in FIG. 2, a configuration in which the connecting/disconnecting mechanism 60 is connected to the connecting mechanism 20 (specifically, the shaft) through, for example, such as a bevel gear 80 can be cited.

In this case, it is only necessary that the torque sensor 30 provided to the connecting mechanism 20 is positioned on a side of the electric motor 200 rather than the connecting point between the connecting mechanism 20 and the connecting/disconnecting mechanism 60.

Figure 3:
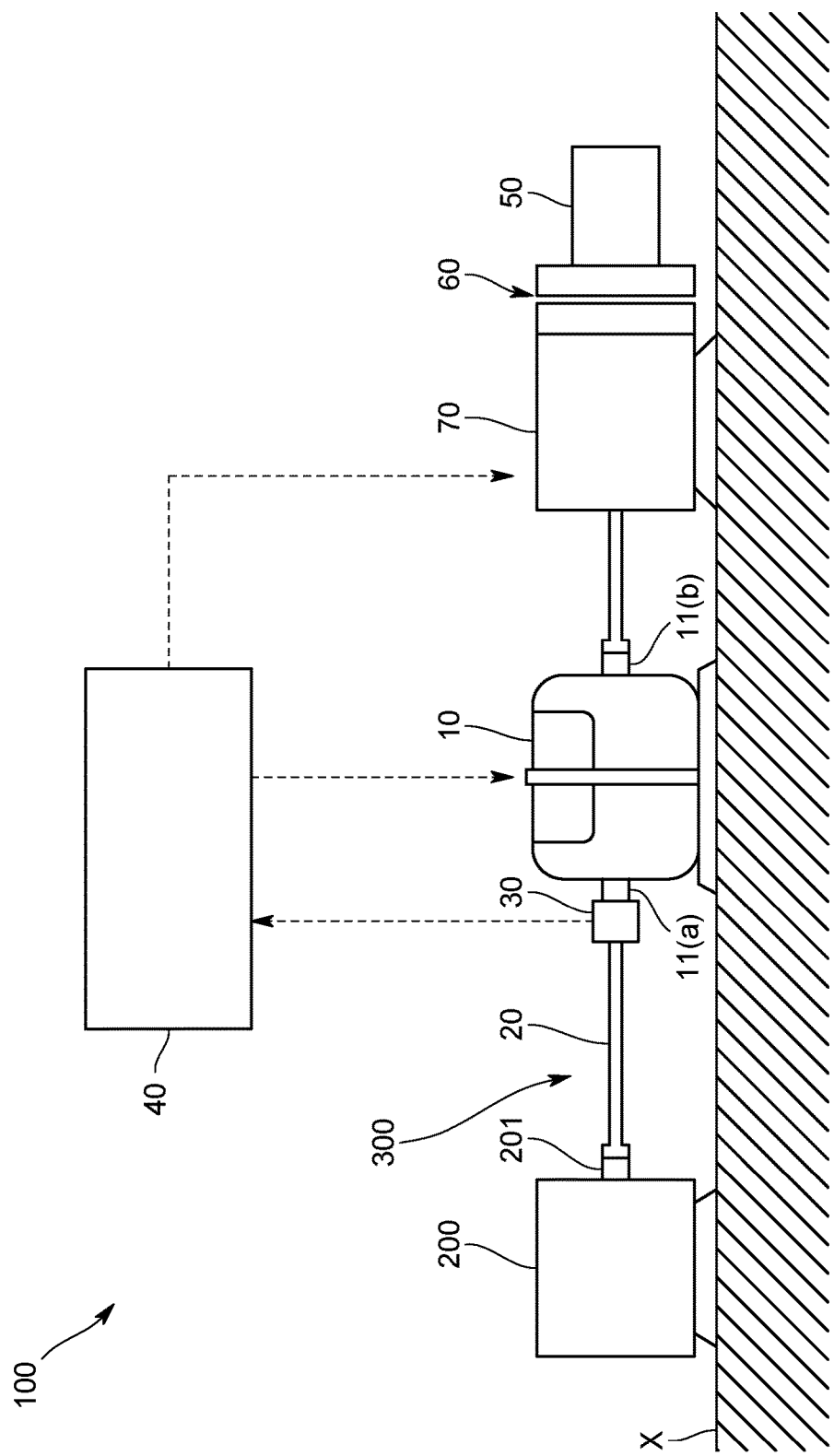
FIG. 3 is a diagram schematically illustrating an overall configuration of an electric motor test system of a variation.

Also, the connecting/disconnecting mechanism 60 in the above-described embodiment is provided between the dynamometer 10 and the speed reducer 70; however, for example, as illustrated in FIG. 3, the connecting/disconnecting mechanism 60 may be provided between the speed reducer 70 and the cogging torque measurement motor 50.

Further, the torque sensor 30 in the above-described embodiment is one of a fixed type, but may be one of, for example, an oscillating type attached to the dynamometer 10.

Still further, as the dynamometer 10 in the above-described embodiment, one of an AC type is used, but one of, for example, a DC type may be used.

In addition, the connecting/disconnecting mechanism 60 in the above-described embodiment is one having the clutch mechanism such as an electromagnetic clutch, but without limitation to the electromagnetic clutch, only required to be one capable of mechanically connecting or disconnecting the cogging torque measurement motor 50 to or from the rotation transmitting system 300.

Also, it is not necessarily required to include the connecting/disconnecting mechanism 60 and the speed reducer 70 in the above-described embodiment.

Further, the cogging torque of the dynamometer 10 may be measured using the electronic motor test system 100 of the above-described embodiment. In this case, it is only necessary to bring the electric motor 200 to an unloaded state. In addition, the torque sensor 30 may be provided between the dynamometer 10 and the cogging torque measurement motor 50.

Note that the above-described embodiment can also be applied to the electric motor test system 100 illustrated in FIG. 2 in the same manner.

In addition, the electric motor test system 100 of the above-described embodiment may be one adapted to test the performance of an electric motor mounted in a fuel cell vehicle (FCV).

Besides, it should be appreciated that the present invention is not limited to any of the above-described embodiment and variations, but can be variously modified without departing the scope thereof.

INDUSTRIAL APPLICABILITY

According to the present invention, without moving the electric motor, the need for alignment such as centering, which has been required in the past whenever measuring cogging toque, can be eliminated and the cogging torque of the electric motor can be easily and accurately measured.

The invention claimed is:

1. An electric motor test system adapted to test performance of an electric motor of a vehicle, the electric motor test system comprising:
   a dynamometer configured to be connected to the electric motor;
   a torque sensor configured to measure a torque of the electric motor;
   a cogging torque measurement motor configured to remain fixed when being connected to and disconnected from the electric motor; and
   a clutch, between the cogging torque measurement motor and dynamometer, configured to
   connect the cogging torque measurement motor to the dynamometer along a direction of a rotating axis that transmits a driving power of the dynamometer responsive to a control signal commanding the clutch to switch to a connection state prior to measuring the cogging torque of the electric motor, and
   disconnect the cogging torque measurement motor from the dynamometer along the direction of the rotating axis that transmits the driving power of the dynamometer responsive to a control signal commanding the clutch to switch to a disconnection state prior to conducting a regular test to test the performance of the electric motor.

2. The electric motor test system according to claim 1, wherein
   the electric motor is connected to one end side of a rotating shaft of the dynamometer, and the cogging torque measurement motor is connected to the other end side of the rotating shaft.

3. The electric motor test system according to claim 1, wherein
   the electric motor is connected to one end side of a rotating shaft of the dynamometer, and the cogging torque measurement motor is connected to the one end side of the rotating shaft or to a connecting mechanism connecting the electric motor to the one end side of the rotating shaft.

4. The electric motor test system according to claim 1, wherein
   the torque sensor is provided on a side of the electric motor rather than the cogging torque measurement motor.

5. The electric motor test system according to claim 1, comprising:
   a speed reducer that is connected to the cogging torque measurement motor to reduce a rotation speed of the cogging torque measurement motor.

6. The electric motor test system according to claim 1, comprising:
   a control device configured to generate the control signal commanding the clutch to switch to the connection state, and to generate the control signal commanding the clutch to switch to the disconnection state.

* * * * *